United States Patent
Linhard

(10) Patent No.: US 8,380,254 B2
(45) Date of Patent: Feb. 19, 2013

(54) SPEAKER DEVICE FOR A VEHICLE

(75) Inventor: Klaus Linhard, Schelklingen (DE)

(73) Assignee: Daimler AG, Stuttgart (DE)

( * ) Notice: Subject to any disclaimer, the term of this patent is extended or adjusted under 35 U.S.C. 154(b) by 110 days.

(21) Appl. No.: 12/937,000

(22) PCT Filed: Mar. 31, 2009

(86) PCT No.: PCT/EP2009/002321
§ 371 (c)(1),
(2), (4) Date: Nov. 30, 2010

(87) PCT Pub. No.: WO2009/124674
PCT Pub. Date: Oct. 15, 2009

(65) Prior Publication Data
US 2011/0077057 A1    Mar. 31, 2011

(30) Foreign Application Priority Data
Apr. 8, 2008 (DE) .......................... 10 2008 017 837

(51) Int. Cl.
*H04M 1/00* (2006.01)
(52) U.S. Cl. ............... 455/569.2; 455/569.1; 455/550.1; 455/570
(58) Field of Classification Search ............... 455/550.1, 455/569.1, 569.2, 570
See application file for complete search history.

(56) References Cited

U.S. PATENT DOCUMENTS

| 4,151,468 A * | 4/1979 | Kerr ............................. 455/90.3 |
| 6,272,362 B1 | 8/2001 | Wang |
| 6,438,247 B1 * | 8/2002 | Cipolla et al. ................ 381/365 |
| 2001/0044329 A1 * | 11/2001 | Newsom ....................... 455/569 |
| 2002/0051554 A1 * | 5/2002 | Rodemer et al. ............... 381/370 |
| 2002/0196949 A1 | 12/2002 | Rodemer et al. |

FOREIGN PATENT DOCUMENTS

| DE | 299 09 964 U1 | 10/1999 |
| DE | 100 33 985 A1 | 5/2001 |
| DE | 100 51 298 C1 | 10/2001 |
| DE | 101 05 513 A1 | 8/2002 |
| EP | 1 231 113 A2 | 8/2002 |
| GB | 2 202 409 A | 9/1988 |

OTHER PUBLICATIONS

German Office Action dated Dec. 9, 2008 (Five (5) pages).
Internatonal Search Report including English translation dated Sep. 30, 2009 and PCT/ISA/237 Form (Fifteen (15) pages).

* cited by examiner

*Primary Examiner* — Fayyaz Alam
(74) *Attorney, Agent, or Firm* — Crowell & Moring LLP

(57) ABSTRACT

In a speech device for a hands-free system in a vehicle, at least one microphone is arranged on a guide element encompassing a safety belt. The guide element is fixed to a free end of a holding element, along which there is arranged a first line section of a signal line and/or a supply line of the microphone. One attachable end of the holding element that is opposite the free end, can be fixed in particular to a vehicle seat associated with the safety belt by means of a detachable mechanical connection that comprises at least one electric contact for the microphone.

13 Claims, 1 Drawing Sheet

SPEAKER DEVICE FOR A VEHICLE

This application is a national stage of PCT International Application No. PCT/EP2009/002321, filed Mar. 31, 2009, which claims priority under 35 U.S.C. §119 to German Patent Application No. DE 10 2008 017 837.3, filed Apr. 3, 2008, the entire disclosure of which is herein expressly incorporated by reference.

BACKGROUND AND SUMMARY OF THE INVENTION

The present invention relates to a speech device for a hands-free system in a vehicle, having at least one microphone that is arranged on a guide element encompassing a safety belt, with the guide element being fixed to a free end of a holding element. A signal line and/or a supply line of the microphone are or is arranged or fixed along the holding element.

From the state of the art are known several hands-free devices for vehicles. The hands-free devices usually comprise at least one microphone and a loudspeaker. German patent document DE 101 05 513 A1, for example, discloses a hands-free device, in which a loudspeaker that can be hooked with a hook to an upper portion of the B column of the vehicle, is connected to a microphone by means of an arm. A guide bracket fastened to the arm comprises a safety belt, so that the microphone is in the neck/chest region of a vehicle operator when fastening the safety belt.

One object of the invention, therefore, is to provide an improved speaker for a hands-free device in a vehicle compared to the state of the art.

This and other objects and advantages are achieved by the speech device for a hands-free device in a vehicle, according to the invention, in which at least one microphone is arranged on a guide element encompassing a safety belt. The guide element is fixed at a free end of a holding element, wherein a first line section of a signal line and/or of a supply line of the microphone are arranged. According to the invention, one attachable end of the holding element that is opposite the free end of the holding element, can be fixed in particular to a vehicle seat associated with the safety belt, by means of a detachable mechanical connection, wherein the connection comprises at least one electric contact for the microphone.

The speech device is mounted in a particularly preferred manner at the vehicle seat in a detachable manner, so as not to affect a function of the safety belt, in particular of a belt slack in an advantageous manner.

Integration of the electric contact for the microphone into a mechanical connection ensures a stabilization of the electric contact, in particular of cable ends of the signal line and/or supply line. In other words: The mechanical connection with integrated electric contact provides a continuous electrical contact.

For a simple and safe contacting of the microphone to the first line section of the signal line and/or the supply line, the electric contact is conveniently formed as a plug-in contact, a clamping contact, a spring contact or a screw contact.

The detachable mechanical connection comprises at least two corresponding connection elements in a possible embodiment, which can in a particular preferred manner be connected in a force-fit and form-fit manner. The holding element with the microphone arranged on the guide element can thereby be arranged at the backrest if necessary, in particular attached or removed therefrom.

In a particularly preferred manner, a first connection element of the detachable mechanical connection is arranged at the attachable end. The first line section and/or supply line thereby ends in the first connection element in a particularly preferred manner.

A second connection element corresponding to the first connection element is preferably arranged at the vehicle seat, in which ends a second line section of the signal line and/or supply line of the microphone. The electric contacting of the microphone can be realized by the mechanical connection of the two connection elements corresponding to each other, e.g. by plugging, screwing, latching.

At least one first connection elements is preferably arranged in the interior vehicle space, in particular at further vehicle seats. The further first connection elements preferably serve to arrange and fasten several microphones of one or more hands-free devices, e.g., for a mobile telephone, or for a speech control of a navigation system or of the mobile telephone.

In a possible embodiment, a number of the first connection elements can correspond to a number of second connection elements, whereby several speech devices can be arranged and fixed at different positions in the interior vehicle space, (e.g., for a passenger and/or occupant in the rear space). Several first connection elements can also be arranged in the interior vehicle space at different positions, wherein only one second connection element can be arranged in one for the first connection elements, so that only one speaker device is given in the interior vehicle space.

In a particularly simple and stable embodiment for the detachable mechanical connection, it is designed as a push button connection or a plug-in connection or a latch connection. Any other suitable type of mechanical connection, as e.g. clamping or spring connections can also be provided.

In an advantageous manner, the holding element has a guide for the signal line and/or the supply line. The guide is formed as a guide bar in a possible embodiment. The guide can for example be fixed at the holding element or be included therein.

The holding element is formed of a flexible plastics or a suitable textile material in a particularly preferred manner. A flexible plastics or a textile material can be used hereby in a particularly preferred manner, which adapts to a contour of the vehicle seat or a body of the person when the safety belt is fastened.

For ensuring an optimal positioning of the microphone when the safety belt is fastened, the holding element has a presettable length in dependence on a fixing point on the vehicle seat, wherein a belt slack of the safety belt is considered in a particularly preferred manner.

Furthermore, the holding element is optically covered by the safety belt in an advantageous manner when the latter is fastened.

The guide element is advantageously formed as a bracket which encompasses the safety belt at least partially such that the guide element with the microphone can be removed from the safety belt without a large effort.

Other objects, advantages and novel features of the present invention will become apparent from the following detailed description of the invention when considered in conjunction with the accompanying drawings.

DETAILED DESCRIPTION OF THE DRAWINGS

Figure 1:
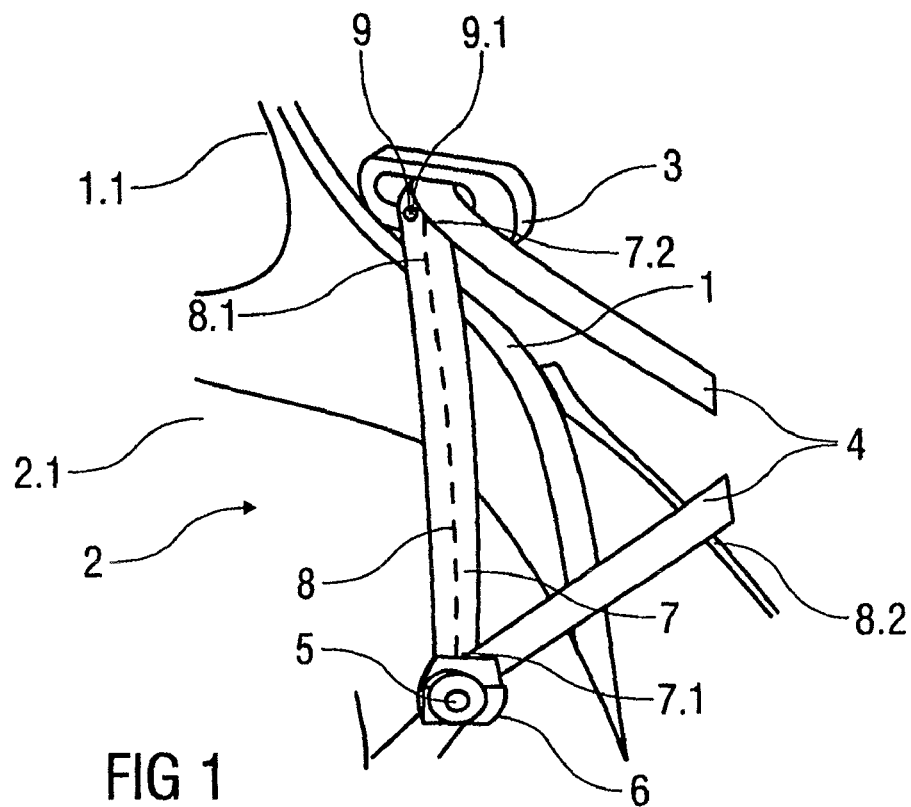
FIG. 1 shows schematically a holding element arranged at the belt deflection point and fixed in a detachable manner, with a microphone of a hands-free device arranged thereon, wherein the microphone is contacted electrically via the detachable fastening.

Parts corresponding to each other are provided with the same reference numerals in all figures.

FIG. 1 shows a section of a backrest 1 of a vehicle seat, with a person 2 indicated as sitting thereon in a vehicle (not shown). In a region laterally of a head rest 1.1, a belt deflection point 3 of a safety belt 4 is arranged without affecting its function. The person 2 sitting on the vehicle seat has fastened the safety belt 4, which is positioned laterally of the person 2.

A microphone 5 as part of a hands-free device is advantageously arranged at the safety belt 4 as a speech device. The speech device is thereby provided for hands-free operating; e.g., for a mobile telephone and/or for speech control of a navigation system arranged in the vehicle or of the mobile telephone itself. The hands-free device comprises a loudspeaker in manner not shown in detail, a transmission and/or reception unit of a mobile telephone and/or of a navigation system.

The microphone 5 is fixed to a guide element 6 that is formed as a bracket, which encompasses the safety belt 4 at least partially in an advantageous manner. The microphone 5 can furthermore be fixed to the guide element 6 in such a manner that is can be aligned to the head (in particular, the mouth) of the person 2 sitting on the vehicle seat in its directional characteristic. The microphone 5 is for example fixed in force-fit and/or material-fit manner on the guide element 6.

The guide element 6 is arranged in a fixed or detachable manner at a free end 7.1 of a holding element 7. In a particularly advantageous manner, the guide element is 6 is formed in such a manner that the safety belt 4 can be rolled up completely during a withdrawal.

A first line section 8.1 (dashed line) of a signal line and/or supply line 8 is arranged at the microphone 5 for the voltage supply of the microphone 5. An electrical contacting of the microphone 5 to the first line section 8.1 of the signal line and/or supply line 8 can be realized by means of a plug-in contact, a clamping contact, a spring contact or a screw contact. The first line section 8.1 of the signal line and/or the supply line 8 of the microphone is arranged along the holding element 7. (For this, a guide bar (not shown) is for example arranged at the holding element 7). Alternatively, the first line section 8.1 of the signal line and/or supply line 8 can be fixed in regular distances by loops arranged at the holding element 7. The first line section 8.1 is guided through the lines for this.

An attachable end 7.2 of the holding element 7 opposite the free end 7.1 is connected to the belt deflection point 3 in an advantageous manner. A first connection element 9.1 of a detachable mechanical connection 9, which comprises an electric contact of the microphone 5, is preferably arranged at the attachable end 7.2. A cable end of the first partial section 8.1 of the signal line and/or supply line preferably ends in the first connection element 9.1

A second connection element (not shown) of the detachable connection 9, corresponding to the first connection element, is fixed at the vehicle seat (in particular, at the belt deflection point 3 arranged there). In the second connection element ends a second partial section 8.2 shown in FIG. 2 of the signal line and/or supply line 8. The second partial section 8.2 of the signal line or supply line 8 is thereby for example disposed at or in the vehicle seat.

By means of the detachable mechanical connection 7, the microphone 5 can preferably be arranged at the safety belt 4 and be removed therefrom when needed.

The detachable connection is formed in a force-fit and form-fit manner in an advantageous manner. In the first connection element 9.1 and the second connection element are arranged contact elements (not shown in detail) which correspond to each other, by means of which the electric contacting to the detachable connection 9 is produced. Thereby, e.g. contacts of at least one contact element can be rings that are arranged in a coaxial manner, which are connected with counter contacts of the corresponding contact element of the respective connection element in a connected state.

In a possible arrangement, the in particular two-part detachable connection, by of which the holding element 7 can be fixed and the line sections 8.1 and 8.2 of the signal line and or supply line 8 contact each other, is designed as a push button connection, a plug-in connection, a screw or snap-on or clamping connection.

In a possible embodiment of the speech device, several first connection elements 9.1 can be arranged in the interior vehicle space, in particular at vehicle seats, in order to arrange or fix further holding elements 7 with microphones 5 of one or several speech devices, e.g. for a mobile telephone and/or for a speech control of a navigation system.

Furthermore, several first connection elements 9.1 can be arranged at the vehicle seats or in the interior vehicle space at different positions, wherein only a second connection element can be arranged in one of the first connection elements 9.1, so that only one speech device is given in the interior vehicle space.

The holding element is advantageously formed of a flexible plastics or a textile material, and in a particularly preferred manner, it adapts to the contour of the vehicle seat or a body of a person 2 in a particularly advantageous manner.

The holding element 7 has a presettable length in order to position the microphone 5 at a neck/chest region 2.1 of the person in an optimal manner. The length can thereby be preset in dependence on the arrangement of the detachable connection 9. The attachable end 7.2 is fixed to the belt deflection point 3 and the holding element 7 lies on a shoulder region of the person 2 without disturbing when the safety belt 4 is fastened corresponding to the guide of the safety belt 4.

By virtue of the presettable length of the holding element 7, the free end 7.1 is in the neck/chest region 2.1 of the person 2, with the guide element 6 fixed thereto and the microphone 5 arranged thereon.

The holding element 7 fixed by means of the detachable connection 9 is optically covered by the safety belt 4 when it is fastened in a particularly advantageous manner.

Figure 2:
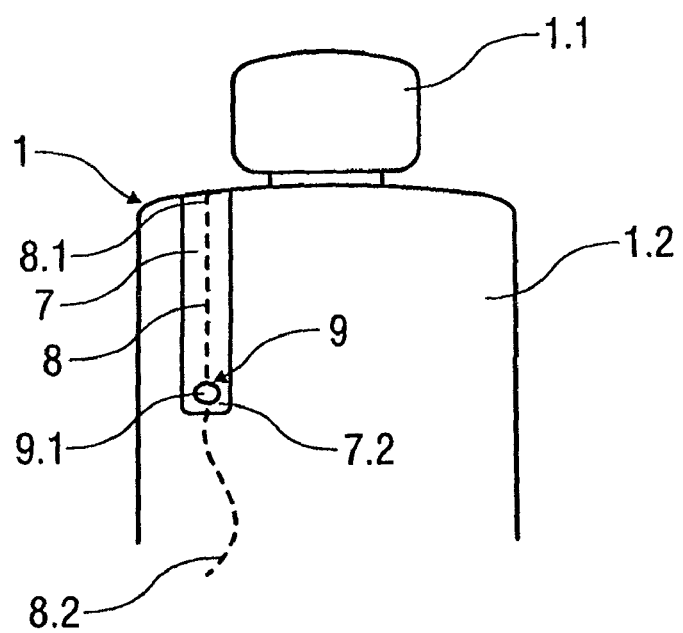
FIG. 2 shows schematically a rear side of a backrest of a vehicle seat with a holding element fixed at this in a detachable manner, wherein a microphone arranged thereon is electrically contacted via the detachable fastening.

FIG. 2 depicts a further possible embodiment for arranging the detachable connection 9. The attachable end 7.2 of the holding element 7 is fixed in a detachable manner at a rear side 1.2 of the backrest 1. The first connection element 9.1 is arranged at the attachable end 7.2 for this. The second connection element (not shown) corresponding to the first connection element is arranged at the backrest 1. The second guide section 8.2 of the signal line and/or supply line 8 is for example arranged at the backrest 1, and disposed in the interior of the vehicle in its further course. The first line section 8.1 of the signal line and/or supply line 8 is arranged at a bottom side of the holding element 7.

Alternatively and/or additionally, one or several first connection elements 9.1 can preferably be arranged at the backrest 1, in order to arrange several speaker devices of one or several hands-free devices in the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Backrest
   1.1 Head rest
   1.2 Rear side
2 Person
   2.1 Neck/chest region
3 Belt deflection point
4 Safety belt
5 Microphone
6 Guide element
7 Holding element
   7.1 Free end
   7.2 Attachable end
8 Supply line
   8.1 First line section
   8.2 Second line section
9 Detachable connection
   9.1 First connection element

The invention claimed is:

1. A speech device for a hands-free system in a vehicle, comprising at least one microphone that is arranged on a guide element for a safety belt, wherein:
the guide element is fixed to a free end of a holding element;
a first line section of a signal or supply line of the microphone is arranged along the holding element;
an attachable end of the holding element that is opposite the free end of the holding element is configured such that it is fixable to a vehicle seat associated, with the safety belt via a detachable mechanical connection; and
the detachable mechanical connection comprises at least one electric contact for the microphone.

2. The speech device according to claim 1, wherein:
the detachable mechanical connection comprises at least a first connection element and a second connection element corresponding thereto.

3. The speech device according to claim 1, wherein:
a first connection element is arranged at the attachable end of the holding element; and
a cable end of the first line element of the signal or supply line ends at said attachable end.

4. The speech device according to claim 3, wherein:
a second connection element corresponding to the first connection element, in which a second line element of the signal or supply line ends, is arranged at the vehicle seat.

5. The speech device according to claim 1, wherein:
the detachable mechanical connection is formed in a force-fit and form-fit manner.

6. The speech device according to claim 1, wherein:
one first connection element is arranged at a position in the interior vehicle space.

7. The speech device according to claim 3, wherein:
a number of second connection elements corresponding to the number of first connection elements is provided.

8. The speech device according to claim 7, wherein:
the detachable mechanical connection is one of a push button connection, a plug-in connection, and a snap-on connection.

9. The speech device according to claim 4, wherein:
the holding element for the line section signal or supply line has a guide.

10. The speech device according to claim 9, wherein:
the holding element is formed of a flexible plastics or a textile material.

11. The speech device according to claim 1, wherein:
the holding element has a presettable length.

12. The speech device according to claim 1, wherein:
the holding element is covered by the safety belt when it is fastened.

13. The speech device according to claim 1, wherein:
the guide element is formed as a bracket, which holds the safety belt at least partially.

* * * * *